(12) United States Patent
Park et al.

(10) Patent No.: US 12,447,775 B2
(45) Date of Patent: Oct. 21, 2025

(54) TYRE WITH BEAD PROFILE STRUCTURE FOR IMPROVING LATERAL STIFFNESS

(71) Applicant: Hankook Tire & Technology Co., Ltd., Seongnam-si (KR)

(72) Inventors: Moon Cheol Park, Daejeon (KR); Sun Myung Kim, Daejeon (KR)

(73) Assignee: Hankook Tire & Technology Co., Ltd., Seongnam-si (KR)

( * ) Notice: Subject to any disclaimer, the term of this patent is extended or adjusted under 35 U.S.C. 154(b) by 0 days.

(21) Appl. No.: 18/844,538

(22) PCT Filed: Mar. 8, 2023

(86) PCT No.: PCT/KR2023/003194
§ 371 (c)(1),
(2) Date: Jan. 7, 2025

(87) PCT Pub. No.: WO2023/172071
PCT Pub. Date: Sep. 14, 2023

(65) Prior Publication Data
US 2025/0170858 A1    May 29, 2025

(30) Foreign Application Priority Data
Mar. 8, 2022    (KR) .......................... 10-2022-0029645

(51) Int. Cl.
*B60C 15/024*    (2006.01)
(52) U.S. Cl.
CPC ................................. *B60C 15/024* (2013.01)

(58) Field of Classification Search
CPC .......................... B60C 15/024; B60C 15/0242
See application file for complete search history.

(56) References Cited

U.S. PATENT DOCUMENTS

2004/0187995 A1* 9/2004 Yoshinaka ................ B60C 3/04
152/454
2016/0200150 A1* 7/2016 Yamamoto .............. B60C 15/04
152/541

FOREIGN PATENT DOCUMENTS

| JP | H11-342709 A | 12/1999 |
|---|---|---|
| JP | 2007-038817 A | 2/2007 |
| JP | 4383158 B2 | 12/2009 |
| JP | 5883208 B2 | 3/2016 |
| JP | 2021-176740 A | 11/2021 |
| KR | 10-2000-0065947 A | 11/2000 |
| KR | 10-0570153 B1 | 4/2006 |
| KR | 20-2008-0001923 U | 6/2008 |
| KR | 10-2020-0121404 A | 10/2020 |

* cited by examiner

*Primary Examiner* — Kendra Ly
(74) *Attorney, Agent, or Firm* — Bridgeway IP Law Group, PLLC; Jihun Kim

(57) ABSTRACT

One embodiment relates to a tyre with a bead profile structure, comprising a tread, sidewalls, and beads 10 for improving lateral stiffness, wherein the bead (10) has a range in which the X-coordinate is 8.8-9.7 mm and the Y-coordinate is 19.2-21.7 mm from origin (O), which is a common European Tyre and Rim Technical Organization (ETRTO) rim standard reference point of a bead outermost point (P) that is in contact with a wheel rim.

3 Claims, 5 Drawing Sheets

TYRE WITH BEAD PROFILE STRUCTURE FOR IMPROVING LATERAL STIFFNESS

TECHNICAL FIELD

The present invention relates to a tyre for a vehicle, and more specifically, to a tyre with a bead profile structure for improving lateral stiffness.

BACKGROUND ART

A typical tyre is designed to have a sidewall including a tread, shoulder, and bead by bead core, bead filler, bead bundle, etc., which are composed of cap plies, belt, carcass, and bead wire.

Among the configurations, the bead, which includes a bead core composed of a plurality of bead wires installed in the center, hard rubber wrapped around the bead core, synthetic tensile rubber and bead filler, and a bead bundle, etc, is the part that contacts the rim, and wraps the end of the coat and attaches the tyre to the rim. Additionally, the bead supports the load applied to the tyre and also serves to transmit torque during braking.

The bead of the configuration is divided into an RPB type bead portion with a rim protect bar (RPB) and an RCL type bead portion with a rim check line (RCL), and FIG. 1 is a cross-sectional view of a conventional RPB type bead portion (a) and an RCL type bead portion (b).

The RPB type bead portion of FIG. 1A is usually applied to the low series standard, and the RCL type bead portion of FIG. 1B is usually applied to the high series standard.

If the bead of the above-described structure is designed to improve lateral stiffness (KL (kgf/mm)), handling performance can be improved. Accordingly, a tyre having a bead profile structure that improves lateral stiffness for improving handling performance is required.

(Patent Document 1) Korea Laid-Open Publication No. 2020-0121404 (published on Oct. 26, 2020)

SUMMARY OF THE INVENTION

Therefore, the present invention is intended to solve the problems of the above-described related art, and aims to solve the technical problem of providing a tyre having a bead profile structure for improving lateral stiffness and enhancing handling performance by applying a new bead profile structure, which is a technical problem to be solved.

Technical Solution

One embodiment of the present invention for achieving the above-described object provides a tyre with bead profile structure for improving lateral stiffness, comprising a tread, side walls, and beads 10, wherein the bead 10 has a range in which the X-coordinate is 8.8-9.7 mm and the Y-coordinate is 19.2-21.7 mm from origin (O), which is a common European Tyre and Rim Technical Organization (ETRTO) rim standard reference point of a bead outermost point (P) that is in contact with a wheel rim. Preferably, the X coordinate of the outermost point (P) of the bead may be 8.8±0.1 mm.

The tyre may be configured to have a bead profile structure for improving lateral stiffness, wherein the tyre section width is positioned at the outermost position when air is injected, so that a rim guard is not required.

The bead 10 may comprise a lower bead portion 11 at the bottom and an upper bead portion 13 at the top based on the outermost point (P) of the bead, the outer curvature radius (R1) of the lower bead portion 11 may have a range of 30 to 100 mm, and the outer curvature radius (R2) of the upper bead portion 13 may have a range of 1000 mm to infinity (straight line).

The inner curved surface of the tyre at the outermost point (P) of the bead may be curved with a curvature radius (R3) of 0.5 to 2 mm, preferably 1 mm.

Advantageous Effects

The tyre according to an embodiment of the present invention described above has a bead profile structure for improving lateral stiffness, thereby significantly improving handling performance.

MOST PREFERRED EMBODIMENT OF THE INVENTION

Figure 1:
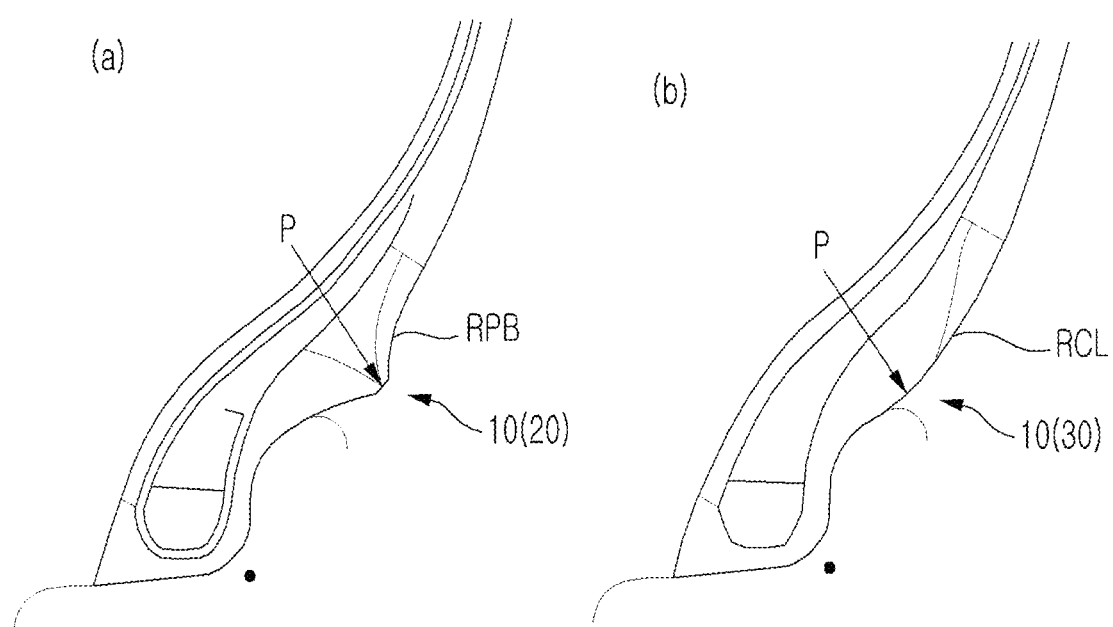
FIG. 1 is a cross-sectional view of the RPB type bead portion (a) and the RCL type bead portion (b) of the related art.

The most preferred embodiment according to the present invention comprises a tread, side walls, and beads 10, wherein the bead 10 has a range in which the X-coordinate is 8.8-9.7 mm and the Y-coordinate is 19.2-21.7 mm from origin (O), which is a common European Tyre and Rim Technical Organization (ETRTO) rim standard reference point of a bead outermost point (P) that is in contact with a wheel rim.

DETAILED DESCRIPTION OF EMBODIMENTS

In the following description of the present invention, if a detailed description of a related known function or configuration is judged to unnecessarily obscure the gist of the present invention, the detailed description will be omitted.

Since embodiments according to the concept of the present invention can have various changes and can have various forms, specific embodiments are illustrated in the drawings and described in detail in this specification or application. However, this is not intended to limit the embodiments according to the concept of the present invention to a specific disclosed form, and it should be understood that the present invention includes all changes, equivalents, or substitutes included in the spirit and technical scope of the present invention.

When a component is said to be "connected" or "accessed" to another component, it is understood that it may be directly connected to or accessed to the other component, but there may also be other components present in between. On the other hand, when it is mentioned that a component is "directly connected" or "directly accessed" to another component, it should be understood that there are no other components in between. Other expressions that describe the relationship between components, such as "between" and "immediately between" or "neighboring" and "directly adjacent to" should be interpreted similarly.

The terms used in this specification are merely used to describe specific embodiments and are not intended to limit the invention. Singular expressions include plural expressions unless the context clearly dictates otherwise. In this specification, terms such as "include" or "have" are intended to indicate the existence of a described feature, number, step, operation, component, part, or combination thereof, but are not intended to indicate the presence of one or more other features or numbers. It should be understood that this does not exclude in advance the possibility of the existence or addition of steps, operations, components, parts, or combinations thereof.

Hereinafter, the present invention will be described in more detail with reference to the attached drawings showing embodiments of the present invention.

Figure 2:
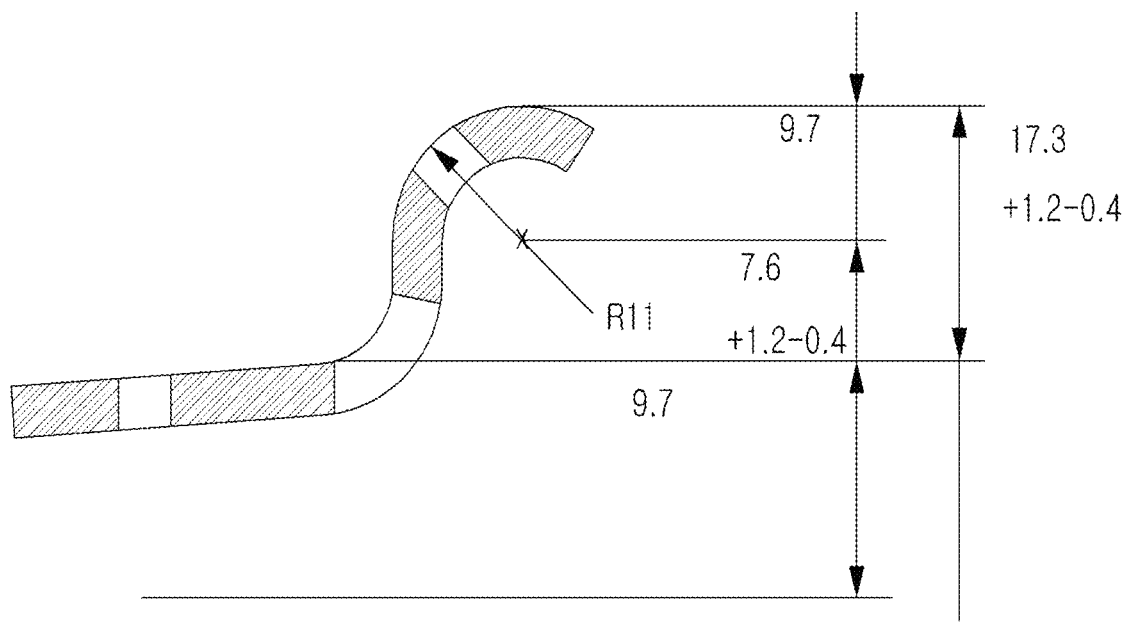
FIG. 2 is a diagram showing a common European Tyre and Rim Technical Organization (ETRTO) rim standard.
Figure 3:
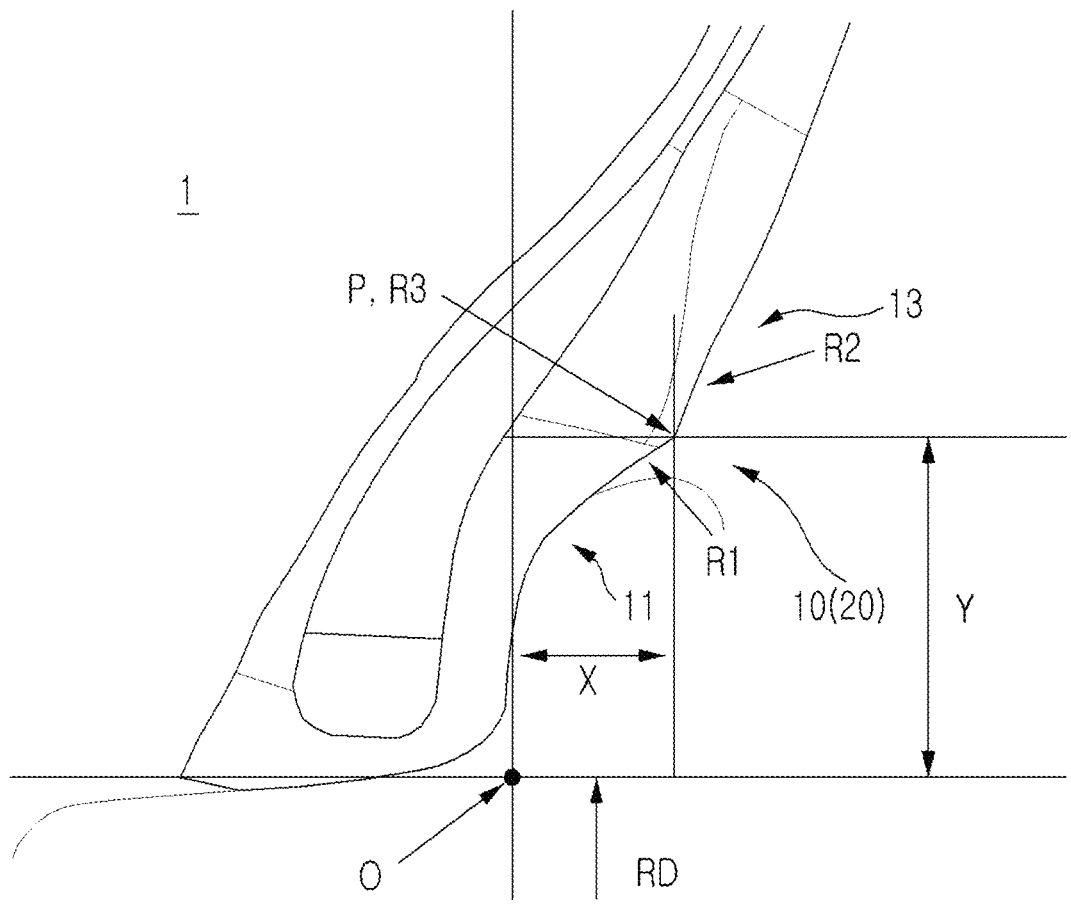
FIG. 3 is a diagram showing the bead profile structure for improving the lateral stiffness of the tyre 1 according to an embodiment of the present invention.

FIG. 2 is a diagram showing a common European Tyre and Rim Technical Organization (ETRTO) rim standard, and FIG. 3 is a diagram showing the bead profile structure for improving the lateral stiffness of the tyre 1 according to an embodiment of the present invention.

As shown in FIG. 2, according to the common ETRTOP standard, the curvature radius (R11) of a rim flange in the transverse direction (X-axis direction) in contact with a tyre of a rim is 9.7 mm. As a result, the highest point in the tyre height direction (Y-axis direction) is formed at the point X-9.7 mm. Additionally, if the curvature radius of the transverse rim flange connected to a rim of a tyre exceeds 9.7 mm, the effect of improving stiffness is reduced because it cannot contact the rim.

Therefore, as shown in FIG. 3, the tyre 1 includes a tread (not shown), side walls (not shown), and beads 10, and the bead 10 has a range in which the X-coordinate is 8.8-9.7 mm, preferably 8.8 mm (or 8.8±0.1 mm), and the Y-coordinate is 19.2-21.7 mm from origin (O), which is a common European Tyre and Rim Technical Organization (ETRTO) rim standard reference point of a bead outermost point (P) that is in contact with a wheel rim. At this time, the bead outermost point (P) is the outermost position of the tyre 1 in contact with the wheel rim.

In addition, the tyre 1 may be configured that when air is injected, the tyre side width (section width: a standard for determining the outermost dimension of the center of a tyre, specified in ETRTO) is positioned at the outermost side, so that a rim guard (a shape that protects the rim) is not required.

In addition, the bead 10 includes a lower bead portion 11 at the bottom and an upper bead portion 13 at the top based on the outermost point (P) of the bead, the outer curvature radius (R1) of the lower bead portion 11 has a range of 30 to 100 mm, and the outer curvature radius (R2) of the upper bead portion 13 has a range of 1000 mm to infinity (straight line).

The curvature radius (R3) of the bead outermost point (P) toward the inside of the tyre is rounded to 0.5 mm to 2 mm, preferably 1 mm.

Figure 4:
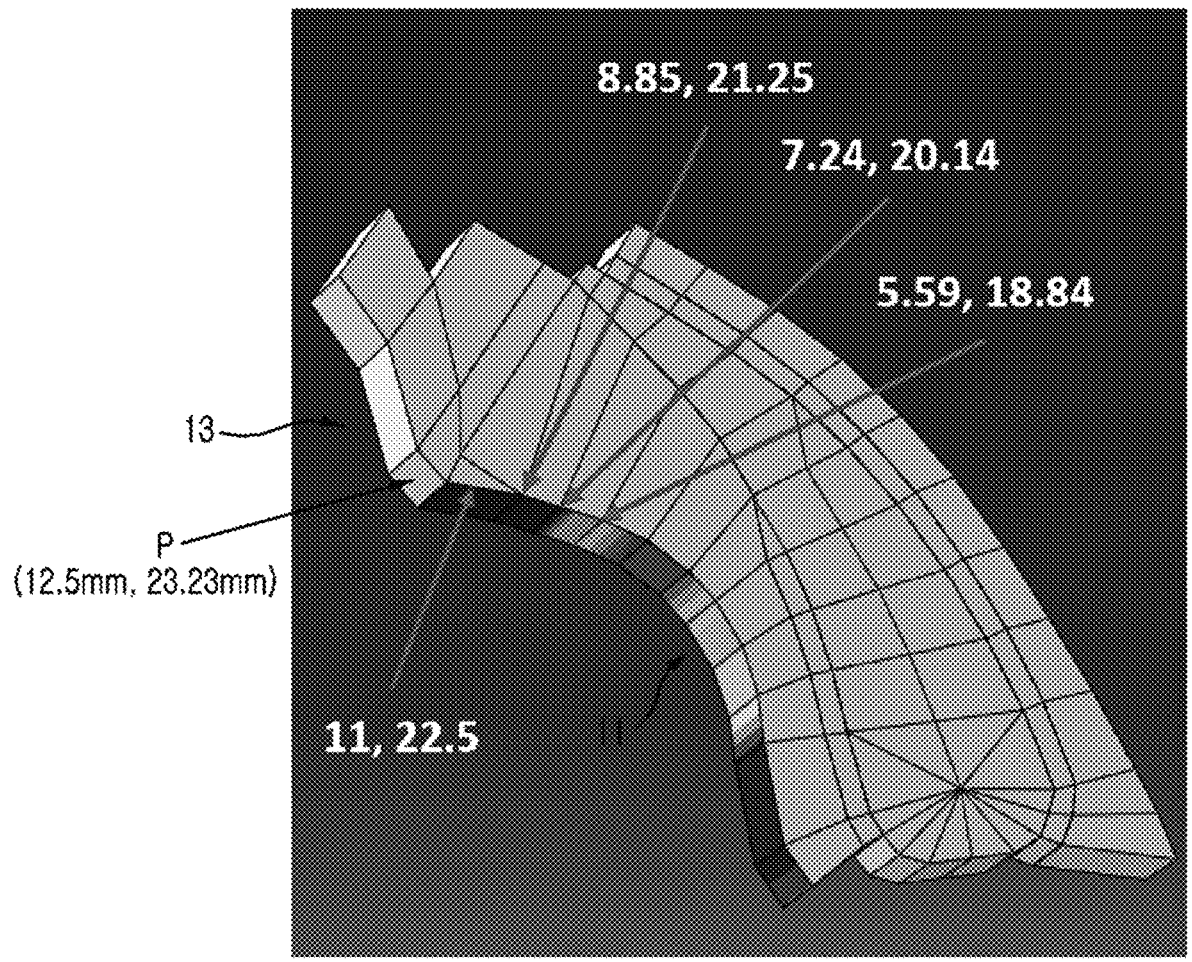
FIG. 4 is a diagram showing the distribution of bead rim contact pressure at a load of 140% of the ETRTO maximum load for a tyre whose X and Y coordinates of the outermost point (P) of the bead are (12.5 mm, 23.23 mm).

FIG. 4 is a diagram showing the distribution of bead rim contact pressure at a load of 140% of the ETRTO maximum load for a tyre whose X and Y coordinates of the outermost point (P) of the bead are (12.5 mm, 23.23 mm).

As shown in FIG. 4, when a load of 140% of the ETRTO maximum load is applied to a tyre whose X and Y coordinates of the bead outermost point (P) are (12.5 mm, 23.23 mm), the tyre and the rim do not contact if the X coordinate of the bead outermost point (P) exceeds 8.8 mm when the X coordinate is based on 8.8 mm. In other words, if a bead profile structure is designed so that the X and Y coordinates of the bead outermost point (P) are (8.85 mm, 21.25 mm), the lateral displacement can be minimized by inducing contact between the tyre and the rim in advance when the load is 140% of the ETRTO maximum load. This minimization of the lateral displacement by the pre-contact improves the lateral stiffness (unit: kgf/mm).

Specifically, the X and Y coordinates of the bead outermost point (P) for improving the lateral stiffness were measured as (8.8 mm, 20.6 mm) for the RPB bead portion (20) and (8.8 mm, 21.2 mm) for the RCL bead portion (30), and the X coordinate can be designed in the range of 8.8 to 9.7 mm depending on the tyre specification. The Y coordinate value according to the variation of the X coordinate can be designed in the range of 19.2 to 21.7 mm.

The X, Y coordinate design values of the bead outermost point (P) are designed within a range where abrasion does not occur on the tyre rim flange, and the basis is the experience from field tests of actual tyres.

As described above, the outer curvature radius (R1) of the lower bead portion 11 is based on 30 mm and can have a processing range of up to 100 mm for further performance improvement. Additionally, the outer curvature radius (R2) of the upper bead portion 13 is based on 1000 mm, but can be changed to a straight line for additional performance improvement.

The curved surface of the bead outermost point (P) toward the inside of the tyre may be rounded to have a curvature radius (R3) of 0.5 mm to 2 mm, preferably 1 mm. In addition, it was confirmed that it is the optimal coordinate for improving lateral stiffness through data from FE analysis and actual tyre evaluation results.

Table 1 is a table measuring the lateral stiffness improvement rate for each coordinate of the outermost point (P) of the RPB bead portion 20 and the RCL bead portion 30 to which the bead profile structure of the present application is applied.

TABLE 1

| Tyre with RCL bead portion | | Tyre with RPB bead portion | |
| --- | --- | --- | --- |
| P coordinate | lateral stiffness (KL) improvement rate | P coordinate | lateral stiffness (KL) improvement rate |
| X1 = 5.0, Y1 = 18.33 | 101% | X1 = 7.3, Y1 = 20.19 | 101% |
| X1 = 5.6, Y1 = 18.85 | 101% | X1 = 7.3, Y1 = 19.74 | 101% |
| X1 = 7.3, Y1 = 20.19 | 102% | X1 = 8.8, Y1 = 21.21 | 100% |
| X1 = 8.8, Y1 = 21.21 | 103% | X1 = 8.8, Y1 = 20.66 | 103% |

TABLE 1-continued

| Tyre with RCL bead portion | | Tyre with RPB bead portion | |
|---|---|---|---|
| P coordinate | lateral stiffness (KL) improvement rate | P coordinate | lateral stiffness (KL) improvement rate |
| X1 = 10, Y1 = 21.94 | 103% | X1 = 10, Y1 = 21.94 | 102% |
| X1 = 12.4, Y1 = 23.23 | 104% | X1 = 12.5, Y1 = 23.23 | 103% |

As shown in Table 1, when the bead profile structure of the present invention is applied to two types of tyres, RCL and RPB, the analysis results show that the lateral stiffness (KL) is improved by about 3%. It was confirmed that when the X-coordinate of the outermost point (P) of the bead profile structure applied to the tyre of the present invention exceeds 8.8 mm, the effect of the pre-contact between the rim and the bead almost disappears, and only the bending stiffness effect due to the increase in rubber volume appears. Accordingly, it was confirmed that the X-coordinate of the outermost point (P) of 8.8 mm is the optimal X-coordinate for improving the lateral stiffness.

Also, in the case of tyres equipped with RPB beads, the X coordinate of the outermost point (P) is 8.8 mm, but the reason why there is a difference depending on the Y coordinate value is because the low sidewall design such as LSH and LSR is different for each tyre standard. For this reason, by applying the Y coordinate in the range of 19.2 to 21.7 mm, it is possible to design the bead profile structure for improving the lateral stiffness according to the standard.

Figure 5:
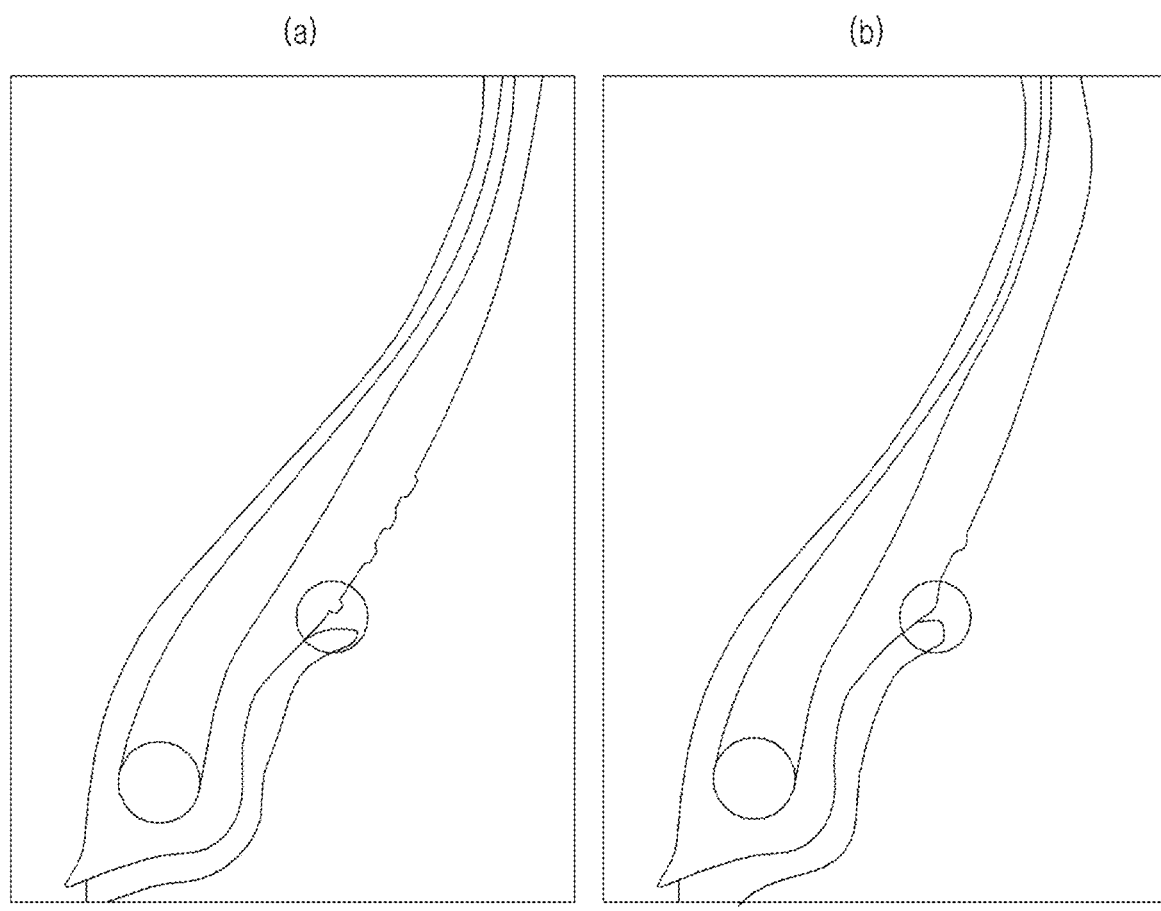
FIG. 5 is a diagram showing the shape change of a tyre (a) to which the bead profile structure of the present disclosure is not applied and a tyre (b) to which the bead profile structure of the present invention is applied.

FIG. 5 is a diagram showing the shape change of a tyre (a) to which the bead profile structure of the present disclosure is not applied and a tyre (b) to which the bead profile structure of the present invention is applied.

As shown in FIG. 5, it can be confirmed that the lateral displacement of the tyre (b) to which the original bead profile structure is applied is reduced, and it can be confirmed that the lateral stiffness is improved by approximately 3% by inducing pre-contact with the rim when a vertical load is applied.

The bead profile structure of an embodiment of the present invention of the above-described configuration can be applied to 04-Ply tyres of the 50 series or higher.

The bead profile structure of an embodiment of the present invention of the above-described configuration can be applied to tyres of various vehicles, such as PCR tyres for passenger cars, racing cars, and electric cars.

The technical idea of the present invention described above has been specifically described in preferred embodiments, but it should be noted that the embodiments are for illustrative purposes only and are not intended for limitation. Additionally, those of ordinary knowledge in the technical field of the present invention will be able to understand that various embodiments are possible within the scope of the technical idea of the present invention. Therefore, the true technical protection scope of the present invention should be determined by the technical idea of the attached claims.

DESCRIPTION OF SYMBOLS

1: Tyre
10: Bead
20: RPB bead portion
30: RCL bead portion
P: Bead outermost point in contact with rim
X: X Coordinate of the outermost point (P)
Y: Y Coordinate of the outermost point (P)
11: Lower bead portion
R1: Lower bead outer curvature radius
R11: Rim flange curvature radius
13: Upper bead portion
R2: Upper bead portion outer curvature radius
O: Origin (reference point according to common ETRTO rim standard)
RD: Rim Diameter

The invention claimed is:

1. A tyre with bead profile structure, the tyre comprising: a tread, side walls, and beads,
wherein each of the beads has a bead outermost point that is configured to have an X-coordinate at 8.8-9.7 mm and a Y-coordinate at 19.2-21.7 mm from a European Tyre and Rim Technical Organization (ETRTO) rim standard reference point, the bead outermost point being configured to be in contact with a wheel rim,
wherein each of the beads comprises a lower bead portion at a bottom and an upper bead portion at a top based on the bead outermost point,
wherein an outer curvature radius of the lower bead portion has a range of 30 to 100 mm, and an outer curvature radius of the upper bead portion has a range of 1000 mm to infinity (straight line).

2. The tyre of claim 1, wherein the tyre is configured to have a section width extending to an outermost position of the tyre in a transverse direction when air is injected, such that the outermost position of the tyre protects the wheel rim and a rim guard that protects the wheel rim is not required.

3. The tyre of claim 1, wherein an inner curved surface of the tyre at the bead outermost point of each of the beads has a curvature radius of 0.5 to 2 mm.

* * * * *